US008703088B2

(12) United States Patent
Lewellyn et al.

(10) Patent No.: US 8,703,088 B2
(45) Date of Patent: Apr. 22, 2014

(54) PROCESS FOR REMOVING HYDRAZINE FROM HYDROXLYAMINE SOLUTIONS

(71) Applicant: Cytec Technology Corp., Wilmington, DE (US)

(72) Inventors: Morris Lewellyn, Stratford, CT (US); Alan S. Rothenberg, Ivins, UT (US); Haunn-Lin Tony Chen, Darien, CT (US); Lino G. Magliocco, Shelton, CT (US); Thomas P. Sassi, Stamford, CT (US)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 13/953,107

(22) Filed: Jul. 29, 2013

(65) Prior Publication Data
US 2013/0315812 A1 Nov. 28, 2013

Related U.S. Application Data

(62) Division of application No. 13/329,906, filed on Dec. 19, 2011.

(60) Provisional application No. 61/425,565, filed on Dec. 21, 2010.

(51) Int. Cl.
| | | |
|---|---|---|
| C01B 21/20 | (2006.01) | |
| C02F 1/68 | (2006.01) | |
| C01B 21/14 | (2006.01) | |
| C01B 21/16 | (2006.01) | |
| C02F 1/00 | (2006.01) | |
| B03D 1/001 | (2006.01) | |
| C02F 5/10 | (2006.01) | |
| C02F 5/12 | (2006.01) | |
| C02F 5/14 | (2006.01) | |

(52) U.S. Cl.
CPC .............. *C01B 21/1481* (2013.01); *C01B 21/14* (2013.01); *C01B 21/16* (2013.01); *C01B 21/1472* (2013.01); *C02F 1/68* (2013.01); *C02F 5/10* (2013.01); *C02F 5/12* (2013.01); *C02F 5/14* (2013.01)
USPC ........... 423/387; 423/407; 210/698; 210/749; 252/60

(58) Field of Classification Search
USPC .......................................................... 210/698
See application file for complete search history.

(56) References Cited

U.S. PATENT DOCUMENTS

| | | | |
|---|---|---|---|
| 4,147,681 | A | 4/1979 | Lim et al. |
| 4,521,317 | A | 6/1985 | Candau et al. |
| 4,587,306 | A | 5/1986 | Vio et al. |
| 4,767,540 | A | 8/1988 | Spitzer et al. |
| 5,171,833 | A * | 12/1992 | Schiessl ........................ 528/486 |
| 6,020,418 | A | 2/2000 | Heitner et al. |
| 6,235,162 | B1 | 5/2001 | Sharifian et al. |
| 6,608,137 | B1 | 8/2003 | Heitner et al. |

FOREIGN PATENT DOCUMENTS

WO 2006/093588 A1 9/2006

* cited by examiner

*Primary Examiner* — Nam Nguyen
*Assistant Examiner* — Clare Perrin
(74) *Attorney, Agent, or Firm* — David P. LeCroy

(57) ABSTRACT

The present invention relates to processes for reducing or eliminating the amount of hydrazine from a hydroxylamine-free base containing hydrazine by treating said hydroxylamine-free base with a scavenger agent, and to the hydroxylamine-free base thereby obtained, as well as to its use for producing microdispersions containing a hydroxamated polymer for use as a flocculant in the Bayer process.

6 Claims, No Drawings

PROCESS FOR REMOVING HYDRAZINE FROM HYDROXLYAMINE SOLUTIONS

CROSS-REFERENCE TO RELATED APPLICATIONS

This application is a divisional application of U.S. patent application Ser. No. 13/329,906 filed Dec. 19, 2011, which claims the benefit of U.S. Provisional Application No. 61/425,565 filed Dec. 21, 2010 the contents of which are incorporated herein by reference in their entirety.

FIELD OF THE INVENTION

The present invention relates to a process for the removal of hydrazine from hydroxylamine and purified hydroxylamine solutions.

BACKGROUND OF THE INVENTION

Hydroxylamine is used in many applications; for example in the production of hydroxamated polyacrylamide as described in U.S. Pat. Nos. 4,767,540 and 6,020,418. Hydroxylamine solutions are commercially available under the form of hydroxylamine salts, especially sulfate and chloride salts, or as hydroxylamine free base. By hydroxylamine free base is meant $NH_2$—OH. Hydroxylamine free base is commercially available, for example as a 50% aqueous solution.

However, Applicants have found that when a polyacrylamide water-in-oil microdispersion was reacted with commercially available hydroxylamine free base, the resulting hydroxamated polymer exhibited a low solution viscosity, which made the hydroxamated polymer ineffective as flocculant in the Bayer process. Applicants have discovered that the commercially available hydroxylamine free base solutions contained some hydrazine, presumably as an impurity, and that this hydrazine was responsible for the generation of the reduced solution viscosity of the hydroxamated polymer. Analysis of different lots of 50% aqueous hydroxylamine free base solutions showed that the hydrazine content was in the range of 500-1200 ppm in solution or 1000-2400 ppm relative to hydroxylamine.

SUMMARY OF THE INVENTION

Applicants have found that these problems can be eliminated by the use of hydroxylamine free base which contains less hydrazine.

The present invention therefore relates to a process for reducing the amount of hydrazine from a hydroxylamine free base containing hydrazine by treating said hydroxylamine free base with a scavenger agent selected from compounds of formula I and/or II

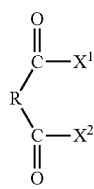

I

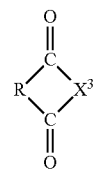

II wherein $X^1$ and $X^2$, each individually, are H, OH, $NR''_2$, $OR'''$, SH, halide or an optionally substituted hydrocarbyl group, with the proviso that not both of $X^1$ and $X^2$ are OH groups, wherein each $R''$, individually, is H or an optionally substituted hydrocarbyl group, $R'''$ is an optionally substituted hydrocarbyl group wherein two $R'''$ groups can also form an optionally substituted ring system; or $R'''$ is an alkali metal (especially Na) or $NR^V_4$ wherein each $R^V$, individually, is H or an optionally substituted hydrocarbyl group;

$X^3$ is O, NR', S, or PR' wherein R' is H, OH, alkali metal (especially Na or K), $NR^{IV}_2$ or alkyl, wherein each $R^{IV}$, individually, is H or an optionally substituted hydrocarbyl group;

R is $CR^1R^2$ where $R^1$ and $R^2$ are, each independently, H or an optionally substituted hydrocarbyl group wherein $R^1$ and $R^2$ can also form an optionally substituted ring, or R is $R^3C$=$CR^4$ where $R^3$ and $R^4$ together form an optionally substituted ring, preferably an optionally substituted aromatic ring, or R is $R^5R^6C$—$CR^7R^8$ where $R^5$ and $R^7$ together form an optionally substituted ring, and $R^6$ and $R^8$ are each independently, H or an optionally substituted hydrocarbyl group, with the proviso that $R^1$ can form a ring system with $X^1$.

By hydrocarbyl is meant a univalent radical derived from a hydrocarbon, i.e., compounds comprising carbon and hydrogen, and include aliphatic hydrocarbons such as alkyls, alkenyls, as well as cyclic compounds, such as alicyclic compounds and aromatic compounds, as well as combinations thereof. By substituted is meant to designate in the present invention, hydrocarbyl groups wherein one or more hydrogen or one or more carbon atom are replaced by another atom or group, such as a halogen, a nitro group, an imide group, a hydroxyl group, an oxygen atom, a sulfur atom, a carboxyl group, an ether group, etc. By optionally substituted is meant to designate both unsubstituted and substituted moieties.

The present invention further relates to a hydroxylamine free base solution containing less than 500 ppm of hydrazine and which contains less than 1 equivalent weight of by-product salt per equivalent of hydroxylamine. By by-product salt is meant to designate any salt that results from the neutralization of hydroxylamine salts, such as hydroxylamine sulfates, sulfites, phosphates, chloride, acetate, propionates and the like, with a base such as sodium hydroxide.

DETAILED DESCRIPTION

The hydroxylamine free base used in the present invention is generally used in the form of an aqueous solution, generally containing about 50% by weight or less of hydroxylamine free base.

The scavenging agent is more preferably selected from compounds of formula I wherein $X^1$ and $X^2$, each individually, are an alkyl group comprising from 1 to 6 carbon atoms, more preferably methyl or ethyl; or $OR'''$ wherein $R'''$ is an alkyl group comprising from 1 to 6 carbon atoms, more preferably methyl or ethyl, or two $R'''$ groups can be connected to form a ring; or NR''$_2$ wherein each R'', individually is H or an alkyl group comprising from 1 to 6, more preferably from 1 to 4, carbon groups.

The scavenging agent is more preferably selected from compounds of formula II wherein $X^3$ is O, NH or N—OH.

The scavenging agent is more preferably selected from compounds of formula I and/or II wherein R is $CR^1R^2$ where $R^1$ and $R^2$ are, each independently, H or alkyl groups; or $R^3C=CR^4$ where $R^3$ and $R^4$ together form an, optionally substituted, aromatic ring system.

The scavenging agent is more preferably selected from compounds of formula I and/or II wherein $R^1$, $R^2$, $R^6$ and $R^8$ are, each independently, H or alkyl groups comprising from 1 to 6, more preferably from 1 to 4, carbon groups, especially methyl and ethyl.

The scavenging agent is more preferably selected from compounds of formula I and/or II wherein $R^3$ and $R^4$ together form an, optionally substituted, aromatic ring system. The substituents on the aromatic ring can be selected from alkyl groups containing from 1 to 6 carbon atoms, nitro groups and imide groups.

The compound of formula II is preferably a compound wherein R is $R^3C=CR^4$.

The scavenging agent is preferably selected from the group of phthalimide; substituted phthalimides bearing one or more groups on the aromatic ring, such as 4-methyl phthalimide and 4-nitrophthamide; substituted phthalimides bearing an alkyl or hydroxy group on the N atom, such as N-hydroxy phthalimide; or the salt of phthalimide such as the potassium or sodium salt; 1,3 diketones, such as acetylacetone; 1,3 diketones with alkyl substitution on the 2 carbon, such as 3-methyl-2,4-pentanedione; 1,3 ketoesters optionally substituted in the 2-position, such as ethyl acetoacetate and ethyl 2-methylacetoacetate; pyromellitic diimide, phthalic anhydride, phthaloyl chloride and phthalamic acid. The scavenging reagent is more preferably selected from the group of phthalimide; substituted phthalimides bearing one or more electron donating groups on the aromatic ring, such as 4-methyl phthalimide; N-substituted phthalimides, such as N-hydroxy phthalimide; 1,3 diketones with alkyl substitution on the 2 carbon, such as 3-methyl-2,4-pentanedione; pyromellitic diimide Most preferred are phthalimide, 4-methyl phthalimide, N-hydroxy phthalimide, 3-methyl-2,4-pentanedione and pyromellitic diimide The treatment of the hydroxylamine free base with the scavenger agent may be conducted at any temperature, generally from about 5° C. to about 90° C., preferably from about 10° C. to about 80° C., more preferably from about 15° C. to 60° C., most preferably from about 15° C. to 40° C.

The treatment with the scavenger agent is generally done prior to using the hydroxylamine free base in the application. A convenient place to apply the scavenger is in the storage vessel, especially when using a scavenger that works well under ambient conditions. The treatment with the scavenger agent can also be done in a suitable vessel where heating or cooling can be applied and adequate mixing is available.

The amount of scavenger agent is generally at least 0.5 mole per mole hydrazine present in the hydroxylamine free base. The amount of scavenger agent per mole of hydrazine present can be high. For those cases where the hydrazine content in the hydroxylamine is already low, for example 50 ppm or less, the amount of scavenger agent can be up to 500 mole per mole of hydrazine. The amount of scavenger agent is usually lower than 200 mole per mole of hydrazine present in the hydroxylamine. Preferably, the amount of scavenger range is from about 1 to about 25 mole, more preferably, from about 1 mole to about 10 mole, and most preferably, from about 1 to about 5 mole, per mole of hydrazine.

The time required for the treatment will depend on the scavenger agent used, the amount, and the temperature and can range from about 1 minute to several weeks. The time usually is from about 1 minute to 1 week. Preferably the time for the treatment is from about 10 minutes to 10 hours, more preferably from about 10 minutes to 5 hours, and most preferably from about 20 minutes to 3 hours.

The process according to the invention may comprise further steps during which the hydroxylamine free base is further treated or purified. The impurities and/or other reaction products formed during the treatment of the hydroxylamine free base with the scavenger may be isolated from the hydroxylamine free base solution by any means suitable therefore. Alternatively the hydroxylamine free base obtained after the treatment with the scavenger may be used as such without isolation of the reaction products obtained. The hydroxylamine free base solution may be diluted by adding water or other solvents or may be concentrated, for example by distillation.

The process according to the invention is especially useful for treating hydroxylamine free base solutions containing more than 50 ppm, i.e. more than 100 ppm, i.e. more than 200 ppm, i.e. more than 500 ppm, of hydrazine based on hydroxylamine free base. The amount of hydrazine usually does not exceed 10% based on hydroxylamine free base.

The process according to the invention permits to obtain hydroxylamine free base solutions containing reduced levels of hydrazine. In particular, the process according to the invention permits to obtain hydroxylamine free base solutions containing less than 500 ppm, more specifically less than 200 ppm, i.e. less than 100 ppm, less than 50 ppm, less than 20 ppm of hydrazine. The process according to the invention permits to obtain hydroxylamine free base containing substantially no hydrazine. Unless stated differently, the amount of hydrazine as mentioned herein is based on the total amount of hydroxylamine. The present invention further relates to a hydroxylamine free base solution containing less than 500 ppm of hydrazine obtained by the process according to the invention.

The present invention further relates to a hydroxylamine free base solution containing less than 500 ppm of hydrazine. In particular the invention relates to a hydroxylamine free base solution containing less than 500 ppm, preferably less than 200 ppm, i.e. less than 100 ppm; less than 50 ppm; less than 20 ppm of hydrazine and which contains less than 1 equivalent weight of by-product salt per equivalent of hydroxylamine. By by-product salt is meant to designate any salt that results from the neutralization of hydroxylamine salts, such as hydroxylamine sulfates, sulfites, phosphates, chloride, acetate, propionates and the like, with a base such as sodium hydroxide. The hydroxylamine free base generally contains less than 0.5 wt %, preferably less than 0.1 wt % of salt. The hydroxylamine free base is more preferably substantially free of by-product salt. Hence hydroxylamine free base solutions containing hydroxylamine free base obtained by the neutralization of hydroxylamine salts, such as hydroxylamine sulfate or hydroxylamine chloride, with a base such as sodium hydroxide, and wherein the salts formed by this neutralization are still present in the solution are disclaimed from the present invention.

The hydroxylamine free base solutions according to the present invention can be used for several purposes, such as in the electronics industry, for example for precleaning of printed circuit board, for use in chemical reactions, for example as reducing agent or in the synthesis of oximes from aldehydes and ketones. The hydroxylamine free base solutions according to the present invention are particularly suitable for use in the preparation of hydroxamated vinyl polymer water-in-oil microdispersions. They permit to obtain higher concentrated hydroxamated vinyl polymer water-in-oil microdispersions than those known from the prior art which have been prepared starting from hydroxylamine salts.

The present invention therefore further relates to a method of producing a microdispersion containing at least one hydroxamated polymer, which comprises reacting a) a water-in-oil micro-dispersion comprising a continuous phase of an oil and an emulsifier and a discontinuous aqueous phase comprising a vinylpolymer containing one or more pendant functional groups which will react with hydroxylamine, with b) a hydroxylamine free base according to the present invention.

The method according to the present invention permits to obtain microdispersions containing a hydroxamated polymer substantially free of by-product salt. The present invention therefore relates to a microdispersion comprising at least one hydroxamated vinyl polymer and less than 1 equivalent of by-product salt per equivalent of hydroxamate group present on the polymer and to different applications and processes using this microdispersion.

The present invention further particularly relates to a process for removing suspended solids from an alumina recovery process wherein a hydroxamated polymer microdispersion according to the invention or obtained according to the method of the invention is used.

Exemplary of the vinyl polymers useful in the present invention are those which contain pendant functional groups which will react with hydroxylamine, i.e. those produced from vinyl monomers such as unsaturated acids such as acrylic, methacrylic, crotonic acids etc.; acid esters such as methyl acrylate, ethyl acrylate, t-butyl acrylate, and the corresponding methacrylate esters; dimethylaminoethyl methacrylate; dimethylaminoethyl acrylate and quaternary salts thereof; methyl crotonate; polymers of maleic anhydride and esters thereof, and the like; nitrile polymers such as those produced from acrylonitrile etc.; amide polymers such as those produced from acrylamide, methacrylamide and the like. The above vinyl monomers may also be copolymerized with each other or with any other anionic, cationic or nonionic monomer, or mixture thereof.

Preferred vinyl polymers are (co)polymers of acrylamide, methacrylamide, acrylic acid, methacrylic acid, acrylic esters and/or methacrylic esters. The term (co)polymer is meant to designate homopolymers as well as copolymers of the above mentioned monomers as well as copolymers with other monomers containing no pendant functional groups which will react with hydroxylamine, such as for example styrene. Most preferred are (co)polymers of acrylamide, acrylic acid and/or acrylic esters. Particularly preferred are (co)polymers of acrylamide. Polymers containing ester groups suitable for hydroxamation may also be derived by esterification of carboxylic acid groups by alkylating agents such as dimethyl sulfate or methyl chloride. For example acrylic esters can be introduced with by copolymerization or post-polymerization esterification of acrylic acid residues.

The vinyl polymers useful in the process according to the invention generally have a high molecular weight. Preferably the vinyl polymers have a weight average molecular weight of at least $1 \times 10^6$, more preferably of at least $5 \times 10^6$ and most preferably of at least $10 \times 10^6$.

The term microdispersion as used in the present invention is intended to include any such forms as microemulsions, emulsions, microsuspensions.

Any emulsifier which is effective such as to provide the proper average diameter of monomer-containing micro-droplets and to prevent the resultant vinyl polymer-containing micro-droplets, which generally range in average diameter size from about 0.02 to about 50 microns, preferably from about 0.1 to about 10 microns, and more preferably from about 0.2 to about 5 microns, from detrimentally agglomerating can be used in the process according to the invention. These emulsifiers are such that the microdispersion of the hydroxamated vinyl polymer remains free flowing i.e. does not experience the agglomeration of the gelled polymer solution micro-droplets such that it becomes incapable of flowing e.g. in the worst case scenario, solidified as a gelled mass.

Suitable emulsifiers useful for these purposes in the preparation of such water-in-oil microdispersions of the vinyl polymers to be hydroxamated include the ethoxylated fatty amines; the alkanolamides of fatty acids; imidazole-fatty acid reaction products; alkanolamine-fatty acid condensation products; sorbitan fatty esters, and the like. Preferably emulsifiers are chosen to result in the formation and maintenance of the polymer-containing micro-droplets ranging in size from about 0.02 to about 50 microns.

It may be advisable to add additional amounts of the same or different emulsifiers to the emulsion to be hydroxamated so as to maintain the integrity thereof during the hydroxamation procedure i.e. the emulsion must be kept stable and gel-free during and after the hydroxamation reaction.

Any known hydrocarbon oil may be used in forming the microdispersion of polymers to be hydroxamated including isoparaffinic, normal or cyclic hydrocarbons such as benzene, xylene, toluene, fuel oil, kerosene, odorless mineral spirits, and mixtures thereof.

The ratio of aqueous phase to hydrocarbon phase in the microdispersions preferably ranges from about 0.5 to about 3.5:1, and more preferably approximates 2.5:1.

The procedure for forming the precursor vinyl polymer microdispersion is well known in the art and may be obtained from any of the U.S. Pat. Nos. 4,521,317 and 4,147,681 which teach the production of such microdispersions.

In the method of producing a microdispersion containing at least one hydroxamated polymer, the hydroxylamine free base generally contains less than 500 ppm hydrazine, preferably less than 200 ppm, more preferably less than 100 ppm and most preferably less than 20 ppm. Particularly preferred is hydroxylamine containing substantially no hydrazine. The amount of hydrazine is based on the total amount of hydroxylamine.

The hydroxylamine free base used in the present invention is generally used in the form of an aqueous solution, generally containing about 50% by weight or less of hydroxylamine free base.

In the method according to the invention, the hydroxylamine free base is preferably used in conjunction with a base, such as potassium hydroxide, sodium hydroxide, ammonia, etc. or any mixtures thereof. The preferred base is sodium hydroxide. The amount of base used is preferably at least equivalent to the amount (on a molar basis) needed to neutralize the resulting hydroxamic acid groups present on the hydroxamated polymer. More preferably the base is used in excess of the amount needed to neutralize the resulting hydroxamic acid groups. Most preferably more than about 5% excess over the minimum required to neutralize the resulting hydroxamic acid groups is used.

The hydroxamation reaction may be conducted at a temperature from about 5° C. to about 90° C., preferably from about 15° C. to about 60° C., more preferably about 15° C. to 40° C.

The degree of hydroxamation, i.e., the concentration of hydroxamate units in the polymers useful herein, may range from about 1 to about 100 mole percent, preferably from about 5 to about 75 mole percent and, most preferably, from about 10 to about 65 mole percent based on all of the monomer units. The remainder of the functional groups that can react with hydroxylamine present on the vinyl polymer may be unreacted or may undergo further reaction, for example with the base. When (co)polymers of acrylamide are used, an excess of base usually leads to the hydrolysis of at least part of the amide groups so that carboxylate groups are formed.

In a preferred embodiment of the method of the invention, a stabilizer suitable to stabilize the vinyl polymer against degradation due to the presence of hydroxylamine is added to the hydroxylamine free base. Suitable stabilizers include water-soluble alkali metal, alkaline earth metal or ammonium thiosulfates; 2-mercaptothiazoles; 2-mercaptothiazolines; thiuram disulfides; thioureas; mercaptoalkanols.

In the method according to the invention, the hydroxylamine free base, excess base and, preferably, the stabilizer is added to and reacted with the precursor vinyl polymer microdispersion in the form of an aqueous solution or as an emulsion. Preferably, the compounds are used in the form of a solution. The emulsion may be formed by adding an aqueous solution of the compounds to any of the oils described above in the presence of an emulsifier such as those disclosed above. The same emulsifier used to form the vinyl polymer microdispersion to be hydroxamated may be used in the formation of the hydroxylamine emulsion charge. A different emulsifier or mixture of emulsifiers may also be used. It is preferred, however, that the result of the presence of the emulsifier(s) is such that the hydroxylamine solution goes into the aqueous phase of the precursor microdispersion and the final hydroxamated vinyl polymer dispersion is stable and gel-free. Homogenization of the aqueous solution with the oil and emulsifier is preferred; however, a useful crude emulsion may be attained by merely stirring said components. Alternatively, the hydroxylamine, excess base and stabilizer can be added directly to the precursor vinyl polymer microdispersion to which may be added, additional oil and emulsifier, with stirring as long as the above discussed criteria are met. Still further, each individual component, i.e. the hydroxylamine, the excess base and the stabilizer, may be formed into individual emulsions and added as such to the precursor vinyl polymer microdispersion.

The degree of hydroxamation is controlled by the ratio of the added hydroxylamine reagent to the precursor vinyl polymer backbone reactive groups, as is known in the art. The instant method results in a very high conversion of hydroxylamine. The degree of hydroxamation may be determined by carbon-13 Nuclear Magnetic Resonance spectroscopy and is quoted herein in mole percent.

The hydroxamated vinyl polymer relative molecular weights may be determined by ascertaining the viscosity of a dilute polymer solution in molar sodium chloride. The Solution Viscosity (SV), as used herein, is determined on a 0.1%, based on the precursor polymer, polymer solution in 1M NaCl at 25° C. using a Brookfield viscometer with UL adapter at 60 rpm. The UL adaptor is an adaptor used with the Brookfield LV viscometer for low viscosity fluids (<20 mPa·s); this adaptor consists of a cup and spindle that fits into the cup with only about 1 mm clearance to measure the viscosity. The limit for measuring viscosity at 60 rpm is 10 mPa·s. For those polymers that have SV greater than 10, measurement is done at 30 rpm and the value obtained is converted to what it would be at 60 rpm using the following relationship: $SV=\exp\{\ln 30 \text{ rpm viscosity} - 0.162\}$. SV is quoted in mPa·s. The Solution Viscosity is a measure that is related to the molecular weight of the hydroxamated polymer. The relationship between Solution Viscosity and molecular weight of a polymer can be determined by size exclusion chromatography, light scattering, and other techniques known to those skilled in the art. The method according to the invention permits one to obtain hydroxamated vinyl polymer water-in-oil microdispersions having Solution Viscosities of over about 2.0 mPa·s, in particular at least 10 mPa·s. It has been known that such polymers are very efficient flocculants, especially in the Bayer process. The polymers can also be used for a number of other applications.

The method according to the invention permits one to obtain hydroxamated vinyl polymer water-in-oil microdispersions having a low level of salts, in particular less than 1 equivalent of by-product salt per equivalent of hydroxamate group present on the polymer. The method according to the invention permits to obtain vinyl polymer water-in-oil microdispersions having a low level of salts, in particular less than 0.5 wt %, e.g. less than 0.1 wt %, of by-product salt. The water-in-oil microdispersions are substantially free of by-product salts as defined here above.

The method according to the invention permits to obtain hydroxamated vinyl polymer water-in-oil microdispersions having a higher concentration than the hydroxamated vinyl polymer water-in-oil microdispersions known from the prior art which have been prepared starting from hydroxylamine salts.

Therefore the present invention further relates to hydroxamated vinyl polymer water-in-oil microdispersions obtainable and obtained by the method according to the invention as described here above.

The present invention therefore relates to hydroxamated vinyl polymer water-in-oil microdispersions comprising at least one hydroxamated vinyl polymer and less than 1 equivalent of by-product salt per equivalent of hydroxamate group present on the polymer. The vinyl polymer water-in-oil microdispersions generally contain less than 0.5 wt %, e.g. less than 0.1 wt %, of by-product salt. The water-in-oil microdispersions are more preferably substantially free of by-product salts as defined here above.

The present invention therefore relates to hydroxamated vinyl polymer water-in-oil microdispersions comprising at least 18% by weight, preferably at least 20% by weight of polymer, calculated on the basis of the vinyl polymer before hydroxamation. The % by weight of polymer in the hydroxamated vinyl polymer water-in-oil microdispersions is calculated based on the weight of the vinyl polymer used in the synthesis and the total weight of all other reactants, compounds, oil and water added to the reaction mixture.

The hydroxamated vinyl polymer water-in-oil microdispersions according to the invention generally have Solution Viscosities of over about 2.0 mPa·s, in particular at least 10 mPa·s.

The hydroxamated vinyl polymer water-in-oil microdispersions according to the invention generally are stable, gel-free water-in-oil microdispersion comprising 1) a continuous phase of a hydrocarbon oil and an emulsifier which is effective so as to prevent the detrimental agglomeration of polymer-containing micro-droplets and 2) a discontinuous phase comprising hydroxamated vinyl polymer-containing micro-droplets.

The other characteristics of the microdispersions have been described here above in relation to the method of the invention. The preferred hydroxamated vinyl polymers are (co)polymers of acrylamide, more preferably having a molecular weight of over about 1,000,000. The hydroxamate group content of the polymer is preferably at least 5 mole % based on monomer units in the polymer. The hydroxamate group content is more preferably from 5 to about 75 mole % and, most preferably, from about 10 to about 65%.

The hydroxamated vinyl polymer water-in-oil microdispersions of this invention can be dissolved directly in water to form aqueous solutions which may be used as, for example, flocculants. Additionally, a breaker emulsifier may be added to the microdispersions or dilution water to which the microdispersion is added to help invert the microdispersion and thereby improve the dissolution characteristics, if necessary or desired. Additionally, the hydroxamated vinyl polymer may be isolated from the microdispersion in the form of a dry powder, such as by precipitation in a non-solvent or by drying. The hydroxamated vinyl polymer water-in-oil microdispersions of this invention may also be used to prepare water-in-oil-in-water microdispersions as described in WO2006/093588.

The hydroxamated vinyl polymer water-in-oil microdispersion of this invention is particularly useful to be used as a flocculant, in particular in the Bayer process. The present invention further relates to a process for flocculation and separation of suspended solids from an industrial process stream comprising suspended solids, wherein a hydroxamated polymer microdispersion according to the invention or obtained according to the method of the invention is used. The hydroxamated polymer microdispersion may be added directly to a process stream, or may first be diluted or dissolved in water before being added to a process stream. Alternatively a water-in-oil-in-water microdispersion as described in WO2006/093588 may be formed and added to the process stream. The industrial process stream can be any stream from which solids need to be separated. Preferably this process stream is a Bayer process stream, e.g., one containing red mud or alumina trihydrate solids.

EXAMPLES

The following examples demonstrate the unique properties of the invention. In the examples here under the following analytical methods have been used;

Determination of the hydrazine content in hydroxylamine free base was determined in accordance with the method of G. W. Watt and J. D. Chrisp, Analytical Chemistry, 24, 2006 (1952). The color reagent employed had the following composition: p-dimethylaminobenzaldehyde, 0.4 g; ethanol, 20.0 ml; and concentrated hydrochloric acid, 2.0 ml. The 50% hydroxylamine free base solution was generally diluted 1:10 for the analysis. Into a 10 ml volumetric flask was placed 2 ml of the color reagent and 50 µl of the diluted hydroxylamine free base solution, and deionized water to the mark. The flask was shaken and allowed to stand for at least 10 minutes to ensure that the color formation is complete. The absorbance is measured at 454 nm wavelength and the hydrazine concentration calculated based on the calibration curve. To obtain a lower limit of about 1 ppm hydrazine concentration, 25 µl of undiluted sample was used with 4 ml of color reagent. It is important that enough p-dimethylaminobenzaldehyde is used to react with both the hydrazine and hydroxylamine in the sample to obtain the proper color response.

The degree of hydroxamation may be determined by carbon-13 Nuclear Magnetic Resonance spectroscopy and is quoted herein in mole percent.

Example 1

Preparation Hydroxylamine Free Base 1.0 g of phthalamic acid (97% purity, Aldrich) is added to 20 g of an aqueous solution containing 50% hydroxylamine free base (commercially available from Aldrich) containing 650 ppm of hydrazine (that is 1300 ppm based on hydroxylamine HA). The solution is stirred at 60° C. for 4 hours. After the treatment, hydrazine level in hydroxylamine free base solution has been determined to be near 0 ppm.

Example 2

Preparation of Hydroxamated Polyacrylamide Microdispersion Using Hydroxylamine Free Base Pre-Treated with Phthalamic Acid An ultra-high molecular weight (≥15 million) water-in-oil inverse polyacrylamide microdispersion with 31.83% polymer solids is prepared following the teaching in U.S. Pat. No. 4,587,306 (Vio). This microdispersion is used for the preparation of hydroxamated polymer microdispersion as described in the following. 263.2 g of polyacrylamide microdispersion, 31.5 g of paraffin oil, and 1.75 g of an ethoxylated fatty amine emulsifier are charged into a reactor. The microdispersion is agitated until reaching a homogeneous dispersion. Meanwhile, a solution for hydroxamating the polymer is prepared in a separate vessel by mixing 16.65 g of the pre-treated hydroxylamine free base solution as obtained in Example 1, 1.0 g of de-ionized water, and 9.3 g of sodium thiosulfate. To this solution, 86.43 g of a 50% sodium hydroxide solution is charged slowly while stiffing. The temperature is controlled below 30° C. during the addition of sodium hydroxide. To conduct hydroxamation, the hydroxamation solution is added slowly into the polyacrylamide microdispersion in the reactor over 16 minutes. 15 minutes after charging the hydroxamation solution, 3.4 g of an ethoxylated nonylphenol surfactant is charged. 30 minutes later 2.5 g of a 30% sodium hydrogen sulfide solution is added and the microdispersion is agitated for an additional hour to finish the reaction. The hydroxamated-polyacrylamide product has 20.15 wt % polymer solids (calculated based on polyacrylamide). The resulting stable gel-free microdispersion has a Solution Viscosity (SV) of 11.1 mPa·s after one day and 9.5 mPa·s after 1 week.

This example demonstrates that a stable high molecular weight hydroxamated polymer microdispersion with a greater than 20 wt % polymer solids can be prepared by the use of a phthalamic acid treated hydroxylamine free base solution. This is significantly higher than the hydroxamated polymer dispersions described in the prior art. Prior art example 3 of U.S. Pat. No. 6,020,418 has been reproduced: the hydroxamated polymer dispersion had a 16 wt % polymer solids (calculated based on polyacrylamide).

Comparative Example 3

The same process as in Example 2 is conducted to prepare this comparative example. The only difference is that, an un-treated hydroxylamine free base solution is used instead of the pre-treated hydroxylamine solution. The resulting stable gel-free microdispersion has a Solution Viscosity of 2.5 mPa·s after one day and 2.8 mPa·s after 1 week. This example shows that, without treating hydroxylamine free base with an effective hydrazine scavenger the produced hydroxamated polyacrylamide microdispersion has a substantially lower Solution Viscosity.

Example 4

An aqueous solution containing 50% hydroxylamine free base containing about 688 ppm of hydrazine (1376 ppm based on HA) was treated with 0.1 g of pyromellitic diimide at room temperature with stirring. After 1h and 15 minutes, the hydrazine content of the solution was 100 ppm (200 ppm based on hydroxylamine).

Examples 5 and 6

20 g of an aqueous solution containing 50% hydroxylamine free base (HA) containing about 955 ppm of hydrazine (1910 ppm based on HA) was treated at room temperature under stirring with different reactants and during different time periods as shown in Table 1. After the treatment, the amount of hydrazine was measured.

TABLE 1

| Reactant | Reactant (g) | Temp °C. | Time | Hydrazine ppm on HA |
|---|---|---|---|---|
| Benzoyl acetone | 1.2 | 20 | 7.5 h | 490 |
| Phthalimide | 0.13 | 20 | 5.25 h | 26 |

Example 7

15 g of 50% aqueous hydroxylamine free base (obtained from BASF), containing 970 ppm hydrazine (1940 ppm based on HA), was treated with phthalimide under the conditions shown in Table 2 to examine the effect of stoichiometry based on hydrazine, time, and temperature on the efficiency for hydrazine removal. The results are shown in Table 2.

TABLE 2

| Phthalimide (g) | Equivalents on Hydrazine | Temp. °C. | Time, min | Hydrazine, ppm on HA |
|---|---|---|---|---|
| 0.2445 | 3.66 | 20 | 15 | 156 |
| 0.2445 | 3.66 | 40 | 15 | 12 |
| 0.0815 | 1.22 | 20 | 45 | 292 |
| 0.0815 | 1.22 | 20 | 15 | 980 |
| 0.2445 | 3.66 | 20 | 45 | 14 |
| 0.0815 | 1.22 | 40 | 15 | 418 |
| 0.0815 | 1.22 | 40 | 45 | 50 |
| 0.2445 | 3.66 | 40 | 45 | 14 |

Examples 8 and 9

Example 7 was repeated except that phthalimide was replaced by, respectively, 3-methyl-2,4-pentadione and phthalamic acid. The results are shown in Tables 3 and 4.

TABLE 3

| 3-Methyl-2,4-pentanedione (g) | Equivalents on Hydrazine | Temp., °C. | Time, min | Hydrazine ppm on HA |
|---|---|---|---|---|
| 0.190 | 3.66 | 20 | 15 | 440 |
| 0.190 | 3.66 | 20 | 45 | 172 |
| 0.063 | 1.22 | 40 | 15 | 982 |
| 0.190 | 3.66 | 40 | 15 | 310 |
| 0.063 | 1.22 | 40 | 45 | 1018 |
| 0.063 | 1.22 | 20 | 15 | 1214 |
| 0.190 | 3.66 | 40 | 45 | 310 |
| 0.063 | 1.22 | 20 | 45 | 1010 |

TABLE 4

| Phthalamic Acid (g) | Equivalents on Hydrazine | Temp, °C. | Time, hr | Hydrazine, ppm on HA |
|---|---|---|---|---|
| 0.4 | 8 | 60 | 4 | 356 |
| 0.4 | 8 | 60 | 2 | 1170 |
| 0.8 | 16 | 20 | 4 | 1706 |
| 0.8 | 16 | 20 | 2 | 1688 |
| 0.4 | 8 | 20 | 4 | 1740 |
| 0.4 | 8 | 20 | 2 | 1734 |
| 0.8 | 16 | 60 | 4 | 12 |
| 0.8 | 16 | 60 | 2 | 330 |

Tables 1, 2, 3 and 4 show that the reagents used are efficient scavengers of hydrazine present in hydroxylamine free base.

Examples 10 to 24

Example 1 has been repeated except that the phtalamic acid has been replaced by the reagents and with treatment conditions described in Table 5. The residual amount of hydrazine was measured after treatment.

TABLE 5

| Example | Treating Reagent | Reagent Conc., wt % | Treatment Conditions | Hydrazine, ppm on HA |
|---|---|---|---|---|
|  | None | N/A | N/A | 1300 |
| 1 | Phthalamic acid | 4.9% | 4 hrs @60° C. | <2 |
| 10 | Cis-1,2,3,6-Tetrahydrophthalimide | 6.6% | 6 hrs @60° C. | 798 |
| 11 | Acetylcyclopentanone | 5.6% | 6 hrs @60° C. | 826 |
| 12 | Acetylacetone | 4.5% | 4 hrs @60° C. | 2 |
| 13C | Succinimide | 2.8% | 2 hrs @60° C. | 1374 |
| 14 | Phthalic anhydride | 2.2% | 1 hr @60° C. | 2 |
| 15 | Ethyl acetoacetate | 5.8% | 6 hrs @60° C. | 660 |
| 16 | Ethyl 2-methylacetoacetate | 6.6% | 4 hrs @60° C. | 192 |
| 17 | Phthalimide | 3.0% | 3 hrs @60° C. | 0 |
| 18 | N-Hydroxyphthalimide | 6.1% | 4 hrs @60° C. | 6 |
| 19 | 4-Methylphthalimide | 6.0% | 4 hrs @60° C. | 8 |
| 20 | 3-Methyl-2,4-pentanedione | 4.3% | 4 hrs @60° C. | 38 |
| 21C | Phthalic acid | 5.0% | 4 hrs @60° C. | 1154 |
| 22C | 2,5-Hexanedione | 4.9% | 4 hrs @60° C. | 1248 |
| 23 | Phthaldialdehyde | 4.9% | 4 hrs @60° C. | 858 |

TABLE 5-continued

| Example | Treating Reagent | Reagent Conc., wt % | Treatment Conditions | Hydrazine, ppm on HA |
|---|---|---|---|---|
| 24 | Phthalimide, potassium salt | 4.0% | 2 hrs @60° C. | 8 |
| 25 | Phthaloyl chloride | 3.6% | 2.5 hrs @5- 60° C. | 2 |

Note that examples 13C, 21C and 22C are comparative examples.

Example 26 to 42 and Comparative Example 43

Examples 26 to 42 and comparative example 43 are hydroxamated polyacrylamide microdispersions prepared as described in Example 2 except that a commercial hydroxylamine free base solution (initially comprising 650 ppm hydrazine in solution, or 1300 ppm on hydroxylamine) pre-treated with the reagents and under the conditions as described in Table 6 were used instead of the hydroxylamine free base of Example 1. Table 6 summarizes the Solution Viscosities of the resulting hydroxamated polymer microdispersions measured after 1 day and 1 week.

TABLE 6

| Example | Treating Reagent of | Reagent Conc., wt % | Treatment Conditions | Hydrazine ppm on HA | SV (1 day) | SV (1 week) |
|---|---|---|---|---|---|---|
| 26 | Phthalimide | 3.0% | 3 hrs @50° C. | <2 | 12.9 | 12.2 |
| 27C | Maleimide | 5.0% | 4 hrs @60° C. | NM | 1.7 | 1.9 |
| 28 | Cis-1,2,3,6-Tetrahydrophthalimide | 6.6% | 6 hrs @60° C. | 798 | 2.6 | 2.8 |
| 29 | Acetylcyclopentanone | 5.6% | 6 hrs @60° C. | 826 | 2.4 | 2.6 |
| 30 | Acetylacetone | 4.5% | 4 hrs @60° C. | 2 | 7.5 | 8.1 |
| 31C | Succinimide | 2.8% | 2 hrs @60° C. | 1374 | 2.1 | 2.2 |
| 32 | Phthalic anhydride | 2.2% | 1 hr @60° C. | 2 | 7.2 | 7.2 |
| 33 | Ethyl acetoacetate | 5.8% | 6 hrs @60° C. | 660 | 4.0 | 4.5 |
| 34 | Ethyl 2-methylacetoacetate | 6.6% | 6 hrs @60° C. | 192 | 7.7 | 7.8 |
| 35C | Maleic anhydride | 2.6% | 16 hrs @60° C. | NM | 3.8 | 3.4 |
| 36 | N-Hydroxyphthalimide | 6.1% | 4 hrs @60° C. | 6 | 10.4 | 9.9 |
| 37 | 4-Nitrophthalimide | 7.1% | 4 hrs @60° C. | NM | 10.3 | 9.9 |
| 38 | 4-Methylphthalimide | 6.0% | 4 hrs @60° C. | 8 | 12.6 | 12.3 |
| 39 | 3-Methyl-2,4-pentanedione | 4.3% | 4 hrs @60° C. | 38 | 12.1 | 13 |
| 40C | Phthalic acid | 5.0% | 4 hrs @60° C. | 1154 | 2.3 | 2.2 |
| 41C | 2,5-Hexanedione | 4.9% | 4 hrs @60° C. | 1248 | 2.3 | 2.2 |
| 42 | Phthaldialdehyde | 4.9% | 4 hrs @60° C. | 858 | 3.1 | 3.2 |
| 43 | None | N/A | N/A | 1300 | 1.7 | 1.8 |

Note that Examples 27C, 31C, 35C, 40C and 41C are comparative examples.

Table 6 shows that hydroxylamine free base pre-treated with a sufficient amount of the right selective scavengers will permit one to obtain solution viscosities that are high (>4 mPa·s, and preferably >10 mPa·s. In the table, NM means not measured. Maleimide, succinimide, and maleic anhydride were less or insufficient hydrazine scavengers and low solution viscosities were obtained. Many of the other hydrazine scavengers were not used in sufficient amount to result in a low enough hydrazine content to give a high solution viscosity of >10 mPa·s, but did lower the hydrazine content enough to give a solution viscosity that is greater than when no scavenger was used.

Example 44

A high molecular weight (>15 million) water-in-oil inverse polyacrylamide microdispersion with 31.83% polymer solids is prepared as described in Example 2. In a separate vessel, 15.72 g of a hydroxylamine free base solution pre-treated with 1% phthalimide for 16 hrs. at room temperature, 1.27 g de-ionized water, and 11.83 g sodium thiosulfate was added. To this solution, 86.43 g of 50% sodium hydroxide solution was charged slowly while stirring, maintaining the temperature below 30° C. This hydroxamation solution was added slowly into the polyacrylamide microdispersion in the reactor over 16 minutes. After 15 minutes of stirring, 3.4 g of an ethoxylated nonylphenol surfactant was charged. 30 minutes later, 2.5 g of a 30% sodium hydrogen sulfide solution was added and the microdispersion was agitated for an additional hour to finish the reaction. The hydroxamated polyacrylamide product has 20.19% polymer solids (calculated based on polyacrylamide). The resulting stable gel-free microdispersion has a Solution Viscosity of 13.3 mPa·s after one day and 12.8 mPa·s after three days.

Example 45

A synthetic Bayer liquor is made by adding 256 g sodium aluminate, 66 g sodium hydroxide, and 40 g sodium carbonate to water to make a total of 1000 ml and heating to 100° C. For the settling tests, red mud solids (obtained from mud slurry typically being discharged to waste at an operating Bayer plant) are mixed with the synthetic liquor, generally giving a slurry containing about 40 g/l suspended solids. Dilute reagent is mixed into the slurry contained in a graduated cylinder, using a perforated plunger, and the time to settle a fixed distance is measured so that a settling rate for the flocculated solids can be calculated. After thirty minutes, a sample of the supernatant liquor is taken and filtered; the solids collected on the filter are then washed and dried to give a measure of the supernatant clarity.

The high solids hydroxamated polymer microdispersion prepared in Example 44 was tested in the synthetic red mud slurry and compared to a lower solids hydroxamated polymer microdispersion (16.7% polymer solids based on backbone polyacrylamide, prepared by the method of Heitner and Ryles, disclosed in U.S. Pat. No. 6,608,137) which also contains 3.35% of sodium sulfate generated from the neutralization of the hydroxylamine sulfate with sodium hydroxide. The results are shown in the table below:

TABLE 7

| Hydroxamated polymer used | As Is Dose (g/t) | Settling Rate (m/hr) | Overflow Solids (g/l) |
|---|---|---|---|
| Comparative (16.7% polymer) | 32.1 | 4.9 | 1.5 |
| | 36.4 | 9.1 | 1.1 |
| | 43.0 | 14.9 | 0.8 |
| Example 44 | 26.8 | 6.4 | 1.0 |
| | 30.3 | 8.9 | 0.8 |
| | 35.7 | 12.7 | 0.7 |

These results show that the higher solids hydroxamated polymer microdispersions of Example 44 give proportionately higher performance than the lower solids comparative product.

Example 46

In Example 46 a hydroxamated polyacrylamide was prepared as described in Example 2 except that an ultra high molecular weight (>15 million) water-in-oil inverse polyacrylamide microdispersion is used with 36.9% polymer solids. This polyacrylamide microdispersion is obtained by submitting the polyacrylamide microdispersion as described in Example 2 to a vacuum distillation at 45° C. for 5 hours. The hydroxamation is carried out as described in Example 2 except that a hydroxylamine free base solution pre-treated with 0.6% phthalimide for 2 hours at 40° C. is used. The final product is a stable hydroxamated polymer microdispersion with 22.5 weight % polymer solids (calculated based on polyacrylamide and a SV of 10.5 mPa·s.

We claim:

1. A process for reducing the amount of hydrazine from a hydroxylamine-free base containing hydrazine, the method comprising treating said hydroxylamine-free base with a scavenger agent chosen from compounds of formula II

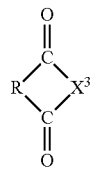

wherein $X^3$ is chosen from: O, NR', S, or PR', wherein R' is chosen from: H, OH, alkali metal, $NR^{IV}{}_2$ or alkyl, wherein each $R^{IV}$ is independently chosen from: H or an optionally substituted hydrocarbyl group;

R is chosen from:
  $CR^1R^2$ where each of $R^1$ and $R^2$ is independently chosen from: H or an optionally substituted hydrocarbyl group, wherein $R^1$ and $R^2$ together can also form an optionally substituted ring;
  $R^3C{=}CR^4$ where $R^3$ and $R^4$ together form an optionally substituted ring; and
  $R^5R^6C{-}CR^7R^8$ where $R^5$ and $R^7$ together form an optionally substituted ring, and
wherein each of $R^6$ and $R^8$ is independently chosen from: H, or an optionally substituted hydrocarbyl group.

2. The process according to claim 1, wherein the scavenging agent is selected from the group consisting of compounds of formula II, wherein $X^3$ is O, NH or N—OH.

3. The process according to claim 1, wherein the scavenging agent is selected from compounds of formula II, wherein R is a) $CR^1R^2$ where each of $R^1$ and $R^2$ is independently chosen from H or an alkyl group; or b) $R^3C{=}CR^4$ where $R^3$ and $R^4$ together form an optionally substituted aromatic ring system.

4. The process according to claim 1, wherein the scavenging agent is at least one member selected from the group consisting of: phthalimide; substituted phthalimides bearing one or more electron donating groups on the aromatic ring; N-substituted phthalimides; and pyromellitic diimide 5. The process according to claim 1 further comprising treating the hydroxylamine-free base with the scavenger agent at a temperature of from 5° C. to 90° C.

6. The process according to claim 1, wherein the amount of scavenger agent used is from 0.5 to 200 moles per mole hydrazine present in the hydroxylamine-free base.

* * * * *